United States Patent
DuLaney (10) Patent No.: US 7,012,391 B2
(45) Date of Patent: Mar. 14, 2006

(54) MOTOR ACCELERATION USING CONTINUOUS SEQUENCE OF CURRENT LIMIT VALUES

(75) Inventor: James Wilford DuLaney, Edmond, OK (US)

(73) Assignee: Seagate Technology LLC, Scotts Valley, CA (US)

(*) Notice: Subject to any disclaimer, the term of this patent is extended or adjusted under 35 U.S.C. 154(b) by 31 days.

(21) Appl. No.: 10/409,967

(22) Filed: Apr. 9, 2003

(65) Prior Publication Data

US 2005/0099148 A1    May 12, 2005

Related U.S. Application Data

(60) Provisional application No. 60/402,428, filed on Aug. 9, 2002.

(51) Int. Cl.
    *H02P 6/08*      (2006.01)
    *H02P 6/20*      (2006.01)

(52) U.S. Cl. .......................... 318/276; 318/439

(58) Field of Classification Search ................ 318/254, 318/276, 430–434, 439
See application file for complete search history.

(56) References Cited

U.S. PATENT DOCUMENTS

| | | | |
|---|---|---|---|
| 4,130,769 A | 12/1978 | Karube | |
| 4,169,990 A | 10/1979 | Lerdman | |
| 4,405,885 A | 9/1983 | Okamoto | |
| 4,531,079 A | 7/1985 | Muller | |
| 4,631,459 A | 12/1986 | Fujioka et al. | |
| 4,633,150 A | 12/1986 | Inaji et al. | |
| 4,673,849 A * | 6/1987 | Sears et al. | ............ 318/272 |
| 4,712,050 A | 12/1987 | Nagasawa et al. | |
| 4,748,386 A | 5/1988 | Nakanishi et al. | |
| 4,888,533 A | 12/1989 | Gotoh et al. | |
| 4,896,807 A | 1/1990 | Mundschau | |
| 4,912,378 A * | 3/1990 | Vukosavic | ................ 318/254 |
| 4,992,710 A | 2/1991 | Cassat | |
| 5,001,405 A | 3/1991 | Cassat | |
| 5,028,852 A | 7/1991 | Dunfield | |
| 5,117,165 A | 5/1992 | Cassat et al. | |
| 5,159,246 A | 10/1992 | Ueki | |
| 5,166,583 A | 11/1992 | Min et al. | |
| 5,184,038 A | 2/1993 | Matsui et al. | |
| 5,189,574 A | 2/1993 | Imamura et al. | |

(Continued)

OTHER PUBLICATIONS

Y. Mizoshita et al., "Vibration Minimized Access Control For Disk Drives," IEEE Transaction On Magnetics, IEEE, vol. 32 ( No. 3), p. 1793-1798, (Apr. 5, 1996).

*Primary Examiner*—Bentsu Ro
(74) *Attorney, Agent, or Firm*—David K. Lucente; Derek J. Berger (57) ABSTRACT

Method and apparatus for accelerating a motor to an operational velocity using a continuous sequence of current limit values derived from a plurality of discrete current limit values. Each discrete current limit value establishes a maximum current magnitude for the motor over a plurality of intermediate velocities less than the operational velocity. Each current limit value in the continuous sequence of current limit values has a different magnitude for each different one of the plurality of intermediate velocities. The continuous sequence of current limit values are preferably derived by generating coefficients of a multi-order polynomial curve in relation to the discrete current limit values, and obtaining the continuous sequence of current limit values in relation to said coefficients. Faster acceleration, reduced current spiking and less acoustic noise during motor acceleration are thereby obtained.

18 Claims, 7 Drawing Sheets

U.S. PATENT DOCUMENTS

| | | | | |
|---|---|---|---|---|
| 5,254,914 | A | 10/1993 | Dunfield et al. | |
| 5,274,310 | A | 12/1993 | Bahn | |
| 5,285,135 | A | 2/1994 | Carobolante et al. | |
| 5,298,839 | A | 3/1994 | Takeda | |
| 5,334,917 | A | 8/1994 | Lind | |
| 5,343,127 | A | 8/1994 | Maiocchi | |
| 5,378,976 | A | 1/1995 | Inaji et al. | |
| 5,397,972 | A | 3/1995 | Maiocchi | |
| 5,541,488 | A | 7/1996 | Bansal et al. | |
| 5,631,999 | A | 5/1997 | Dinsmore | |
| 5,668,680 | A | 9/1997 | Tremaine | |
| 5,703,449 | A | 12/1997 | Nagate et al. | |
| 5,745,545 | A | 4/1998 | Hughes | |
| 5,777,448 | A | 7/1998 | Matsui | |
| 5,780,983 | A | 7/1998 | Shinkawa et al. | |
| 5,793,558 | A | 8/1998 | Codilian et al. | |
| 5,831,403 | A * | 11/1998 | Kanki et al. | 318/286 |
| 5,841,252 | A | 11/1998 | Dunfield | |
| 5,870,363 | A | 2/1999 | Sun et al. | |
| 5,901,009 | A | 5/1999 | Sri-Jayantha et al. | |
| 5,929,577 | A | 7/1999 | Neidorff et al. | |
| 5,963,706 | A | 10/1999 | Baik | |
| 5,982,571 | A | 11/1999 | Calfee et al. | |
| 5,998,946 | A | 12/1999 | Kim | |
| 6,002,971 | A | 12/1999 | Lucas | |
| 6,011,373 | A | 1/2000 | McConnell et al. | |
| 6,078,158 | A | 6/2000 | Heeren et al. | |
| 6,100,656 | A | 8/2000 | El-Sadi et al. | |
| 6,114,825 | A | 9/2000 | Katz | |
| 6,148,240 | A | 11/2000 | Wang et al. | |
| 6,160,367 | A | 12/2000 | Higashi et al. | |
| 6,178,060 | B1 | 1/2001 | Liu | |
| 6,256,163 | B1 | 7/2001 | Schmidt et al. | |
| 6,294,891 | B1 | 9/2001 | McConnell et al. | |
| 6,320,345 | B1 | 11/2001 | Yuan et al. | |
| 6,710,567 | B1 * | 3/2004 | Heydt et al. | 318/560 |
| 6,737,824 | B1 * | 5/2004 | Aslan et al. | 318/471 |

* cited by examiner

MOTOR ACCELERATION USING CONTINUOUS SEQUENCE OF CURRENT LIMIT VALUES

RELATED APPLICATIONS

This application claims domestic priority under 35 U.S.C. §119(e) to U.S. Provisional Application No. 60/402,428 filed Aug. 9, 2002.

FIELD OF THE INVENTION

The claimed invention relates generally to motor control systems and more particularly, but not by way of limitation, to a method and an apparatus for accelerating a motor such as an electrically commutated brushless direct current (dc) spindle motor such as the type used in a data storage device to rotate a data recording disc.

BACKGROUND

Electrically commutated, brushless direct current (dc) motors (spindle motors) are inductive motors used in a wide variety of commercial applications. One common application of such motors is in data storage devices, which use the motors to rotate one or more axially aligned data recording discs at a constant high speed (such as 10,000 revolutions per minute, rpm). As the discs are rotated, data transducing heads are controllably moved across the disc surfaces to access concentric tracks to which data are stored.

One type of spindle motor incorporates a stationary stator portion which supports multiple phase windings which are electrically connected in a star or delta configuration. A rotatable rotor supports a corresponding array of permanent magnets adjacent the windings. The rotor is rotated by electrically commutating the phase windings in a selected sequence. During each commutation period, drive current is input to one phase, output from another phase, and the remaining phase(s) are held at high impedance.

Spindle motors can employ back electromotive force (bemf) detection to detect the electrical rotational state of the motor and to time the application of each new set of drive pulses. Acceleration of a spindle motor from rest generally includes determining the initial electrical rotational alignment of the rotor with the stator, applying short duration drive pulses to accelerate the rotor from rest to an intermediate velocity at which the motor generates sufficient bemf to allow reliable detection of the rotational position of the motor, and then electrically commutating the spindle motor using closed loop bemf detection circuitry to accelerate the rotor to the final operational velocity.

It is desirable to limit the maximum current applied to a spindle motor to prevent damage to the motor windings and associated control circuitry. Excessive current draw can also adversely affect the voltage output of a power supply used to supply power to the motor as well as to other electronic circuits. However, reducing the maximum available levels of drive current generally reduces torque and increases the time required to accelerate the motor to the final operational velocity.

Accordingly, there is a continued need for improvements in the art whereby a spindle motor can be reliably accelerated from rest to an operational velocity, and it is to such improvements that the present invention is directed.

SUMMARY OF THE INVENTION

As embodied herein and as claimed below, the present invention is generally directed to a method and an apparatus for accelerating a motor to an operational velocity.

In accordance with preferred embodiments, the method preferably comprises a step of accelerating the motor using a continuous sequence of current limit values derived from a plurality of discrete current limit values. Each discrete current limit value establishes a maximum current magnitude for the motor over a plurality of intermediate velocities less than the operational velocity. Each current limit value in the continuous sequence of current limit values has a different magnitude for each of the plurality of intermediate velocities.

The continuous sequence of current limit values is preferably derived by generating coefficients of a multi-order polynomial curve in relation to the discrete current limit values, and obtaining the continuous sequence of current limit values in relation to said coefficients.

In another aspect, the apparatus preferably comprises a current limit generator block which outputs a continuous sequence of current limit values to limit magnitudes of current applied to the motor during said acceleration, wherein the continuous sequence of current limit values are derived from a plurality of discrete current limit values, wherein each discrete current limit value establishes a maximum current magnitude for the motor over a plurality of intermediate velocities less than the operational velocity, and wherein each current limit value in the continuous sequence of current limit values has a different magnitude for each different one of the plurality of intermediate velocities.

The current limit generator block preferably uses coefficients of a multi-order polynomial curve to output the continuous sequence of current limit values, wherein the coefficients of the multi-order polynomial curve are determined by providing an initial current limit table comprising a stepped sequence of discrete current limit values each applied while the motor is operated at a plurality of intermediate rotational velocities less than the operational velocity, and performing a multi-order polynomial curve fit of the stepped sequence of discrete current limit values.

The apparatus further preferably comprises a switching circuit which selectively applies current pulses to the motor to accelerate the motor in relation to the application of commutation drive signals, and a control block which applies the commutation drive signals to the switching circuit in relation to the continuous sequence of current limit values.

The apparatus further preferably comprises back electromotive force (bemf) detection circuitry which detects bemf from rotation of the motor, and wherein the control block further applies the commutation drive signals to the switching circuit in relation to the bemf detected by the bemf detection circuitry.

Use of the continuous sequence of current limit values generally provides improved motor acceleration characteristics, including faster acceleration from rest to the operational velocity, improved current control characteristics (including reduced current spiking), and a reduction in the generation of acoustic noise.

Generating the current limit values in this manner can also reduce memory requirements as compared to that required to store and utilize the discrete current limit table, which can be important in high performance applications where internal memory and other overhead control considerations are at a premium.

These and various other features and advantages which characterize the claimed invention will become apparent upon reading the following detailed description and upon reviewing the associated drawings.

DETAILED DESCRIPTION

Figure 1:
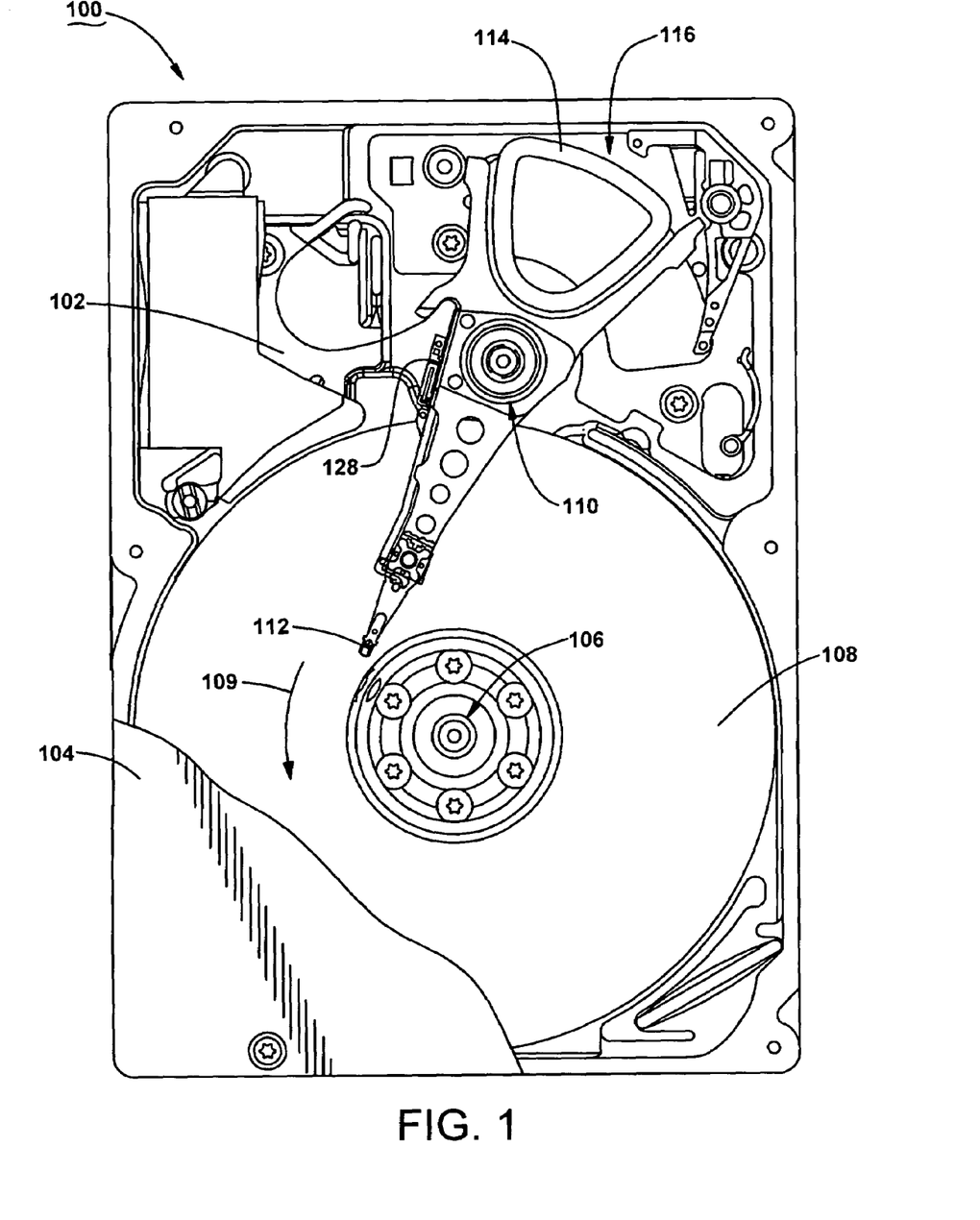
FIG. 1 is a top plan view of a data storage device which stores data to an array of rotatable discs, the discs rotated by a spindle motor controlled in accordance with preferred embodiments of the present invention.

FIG. 1 provides a top plan view of a data storage device 100 constructed in accordance with preferred embodiments of the present invention. The data storage device is preferably characterized as a disc drive of the type used to magnetically store digital data from a host device (not shown).

The data storage device 100 includes a base deck 102 and a top cover 104 (shown in partial cutaway) which cooperate to form a sealed housing. A spindle motor 106 is supported within the housing to rotate a number of magnetic recording discs 108 at a constant, high speed in direction 109. For purposes of the present discussion, it will be contemplated that the spindle motor 106 is a three phase direct current (dc) inductive motor which rotates the discs 108 at an operational velocity of about 10,000 revolutions per minute (rpm) during device operation.

A rotary actuator 110 controllably moves a corresponding number of data transducing heads 112 across recording surfaces of the discs 108 through application of current to a coil 114 of a voice coil motor (VCM) 116. The heads 112 are aerodynamically supported over the recording surfaces by fluidic currents established by rotation of the discs 108. The heads 112 access data tracks (not separately shown) defined on the various disc surfaces to write data to and read data from the discs 108.

Figure 2:
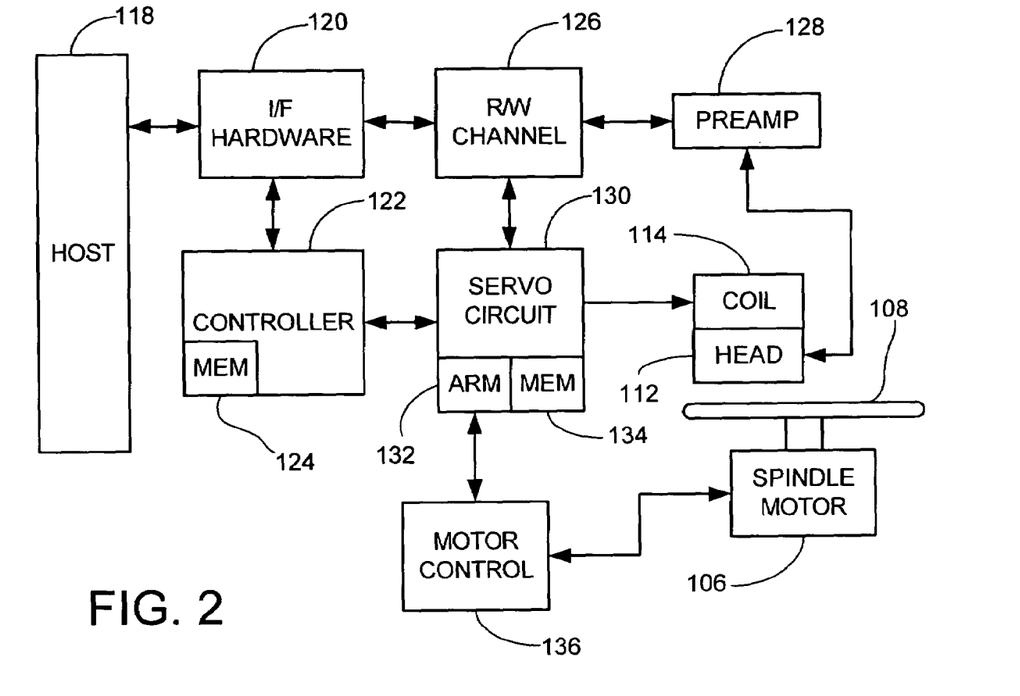
FIG. 2 provides a functional block diagram of the data storage device of claim 1.

FIG. 2 provides a functional diagram of the device 100 in conjunction with a host computer 118. Various electronic circuits shown in FIG. 2 are supported on a printed circuit board (PCB) which is mounted to the underside of the base deck 102, and is thus not visible in FIG. 1.

Commands from the host device 118 are serviced using interface (I/F) hardware 120 in conjunction with a programmable, top level control processor 122 (controller). Control programming for the controller 122 is stored in memory (MEM) 124.

Data transfers between the host device 118 and the discs 108 are carried using a read/write (R/W) channel 126 and preamplifier/driver circuitry (preamp) 128. The preamp 128 is preferably supported on the actuator 110 (FIG. 1) in proximity to the heads 112.

Head positional control is provided by a closed-loop servo circuit 130 having a programmable ARM (advanced RISC machine) device 132 with associated memory 134. Servo signals transduced from servo data embedded on the various disc surfaces are digitized and provided to the ARM 132 which, in turn, provides current command signals to coil driver circuitry (not separately shown in FIG. 2) to apply current to the actuator coil 114. The ARM 132 further operates to provide current command signals to a motor control circuit 136 used to control the rotation of the spindle motor 106.

Figure 3:
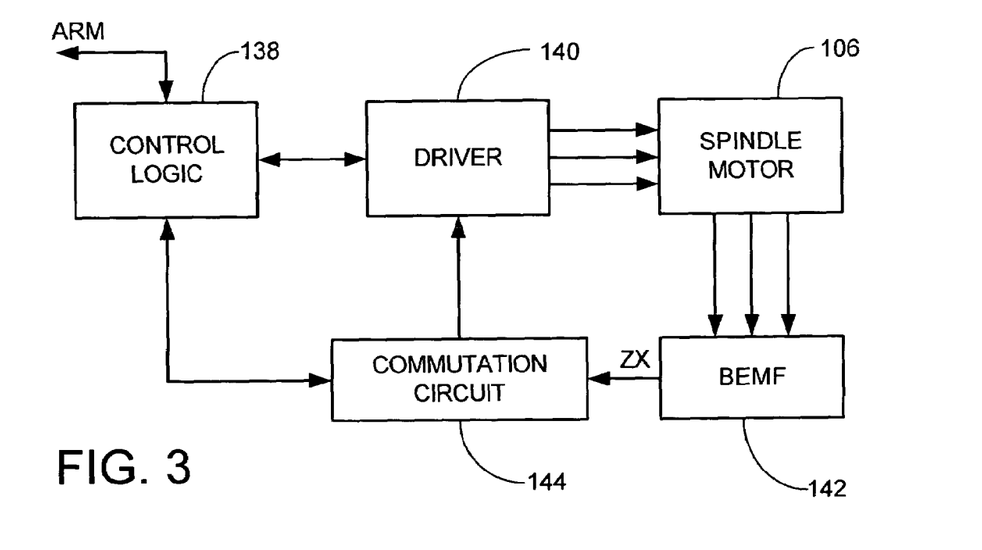
FIG. 3 is a functional block diagram of the motor control circuit of FIG. 2.

FIG. 3 provides a functional block diagram of relevant portions of the motor control circuit 136 of FIG. 2. Control logic 138 receives commands from and outputs state data to the ARM 132. Spindle driver circuitry 140 applies drive currents to the phases of the spindle motor 106 over a number of sequential commutation steps to rotate the motor. During each commutation step, current is applied to one phase, sunk from another phase, and a third phase is held at a high impedance in an unenergized state.

Back electromotive force (bemf) detection circuitry 142 measures the bemf generated on the unenergized phase, compares this voltage to the voltage at a center tap, and outputs a zero crossing (ZX) signal when the bemf voltage changes polarity with respect to the voltage at a center tap. A commutation circuit 144 uses the ZX signals to time the application of the next commutation step.

Figure 4:
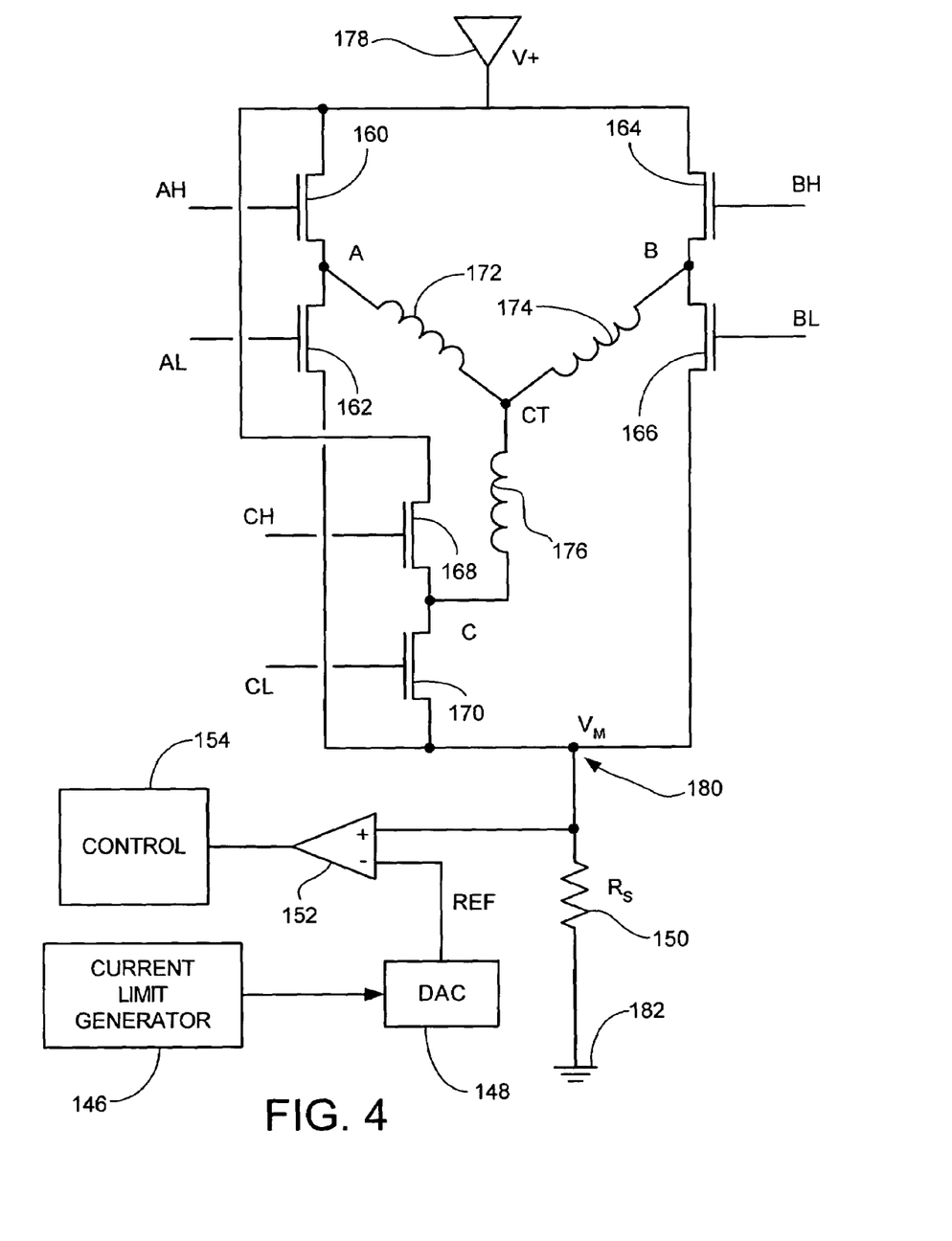
FIG. 4 provides an electrical schematic diagram of the spindle motor in conjunction with the motor control circuit of FIG. 3.

Relevant portions of the spindle motor circuitry 140 are shown in FIG. 4 in conjunction with a schematic representation of the spindle motor 106. The spindle motor driver 140 generally includes a current limit generator block 146, a digital to analog converter (DAC) 148, a current sense ($R_S$) resistor 150, a comparator 152 and a control block 154.

The spindle driver circuitry 140 is further shown to include six field effect transistors (FETs) 160, 162, 164, 166, 168 and 170, with inputs denoted as AH (A high), AL (A low), BH, BL, CH and CL, respectively. These FETs are collectively referred to herein as a switching circuit. Controlled, timed application of commutation drive signals to the gates of the various FETs result in the application of current drive pulses through A, B and C phase windings 172, 174 and 176 from a voltage source 178 to $V_M$ node 180, through the $R_S$ sense resistor 150, and on to reference node (ground) 182. Spindle motor commutation steps (states) are defined in Table 1:

TABLE 1

| Commutation State | Source Phase | Sink Phase | Phase Held at High Impedance |
| --- | --- | --- | --- |
| 1 | A | B | C |
| 2 | A | C | B |

TABLE 1-continued

| Commutation State | Source Phase | Sink Phase | Phase Held at High Impedance |
|---|---|---|---|
| 3 | B | C | A |
| 4 | B | A | C |
| 5 | C | A | B |
| 6 | C | B | A |

During commutation step 1, phase A (winding 172) is supplied with current, phase B (winding 174) outputs (sinks) current, and phase C (winding 176) is held at high impedance. This is accomplished by selectively turning on AH FET 160 and BL FET 166, and turning off AL FET 162, BH FET 164, CH FET 168 and CL FET 170. In this way, current flows from source 178, through AH FET 160, through A phase winding 172, through the center tap (CT node 184), through B phase winding 174, through BL FET 166 to $V_M$ node 170, and through $R_S$ sense resistor 150 to ground 182. For reference, it will be noted that the A, B and C phase windings 172, 174, 176 are connected in a star (y) configuration without a separate center tap connection, but other internal connection methodologies (including a star with a center tap connection and a delta configuration) can readily be employed as desired.

The resulting current flow through the A and B phase windings 172, 174 induces electromotive fields which interact with a corresponding array of permanent magnets (not shown) mounted to the rotor (spindle motor hub), thus inducing torque upon the spindle motor hub in the desired rotational direction. The appropriate FETs are sequentially selected to achieve the remaining commutation states shown in Table 1.

The magnitude of current passing through the motor 106 is controlled in relation to the voltage drop across the sense resistor 150. The voltage at node 180 is presented to the positive input of the comparator 152, and an analog reference voltage (REF) output by the DAC 148 is supplied to the negative input of the comparator 152.

When the voltage at node 180 exceeds the REF value, a first output level is provided to the control block 154 by the comparator 152, indicating that too much current is flowing through the motor 106. Contrawise, when the voltage at node 180 falls below the REF value, a second output level is provided to the control block 154 by the comparator 152, indicating that too little current is flowing through the motor 106. Preferably, the control block 154 maintains the high side FET (in this case AH FET 160) in a continuously on state while pulse width modulating the low side FET (in this case the BL FET 166) to maintain the average current through the motor 106 at the level determined by the REF value.

Figures 5, 7:
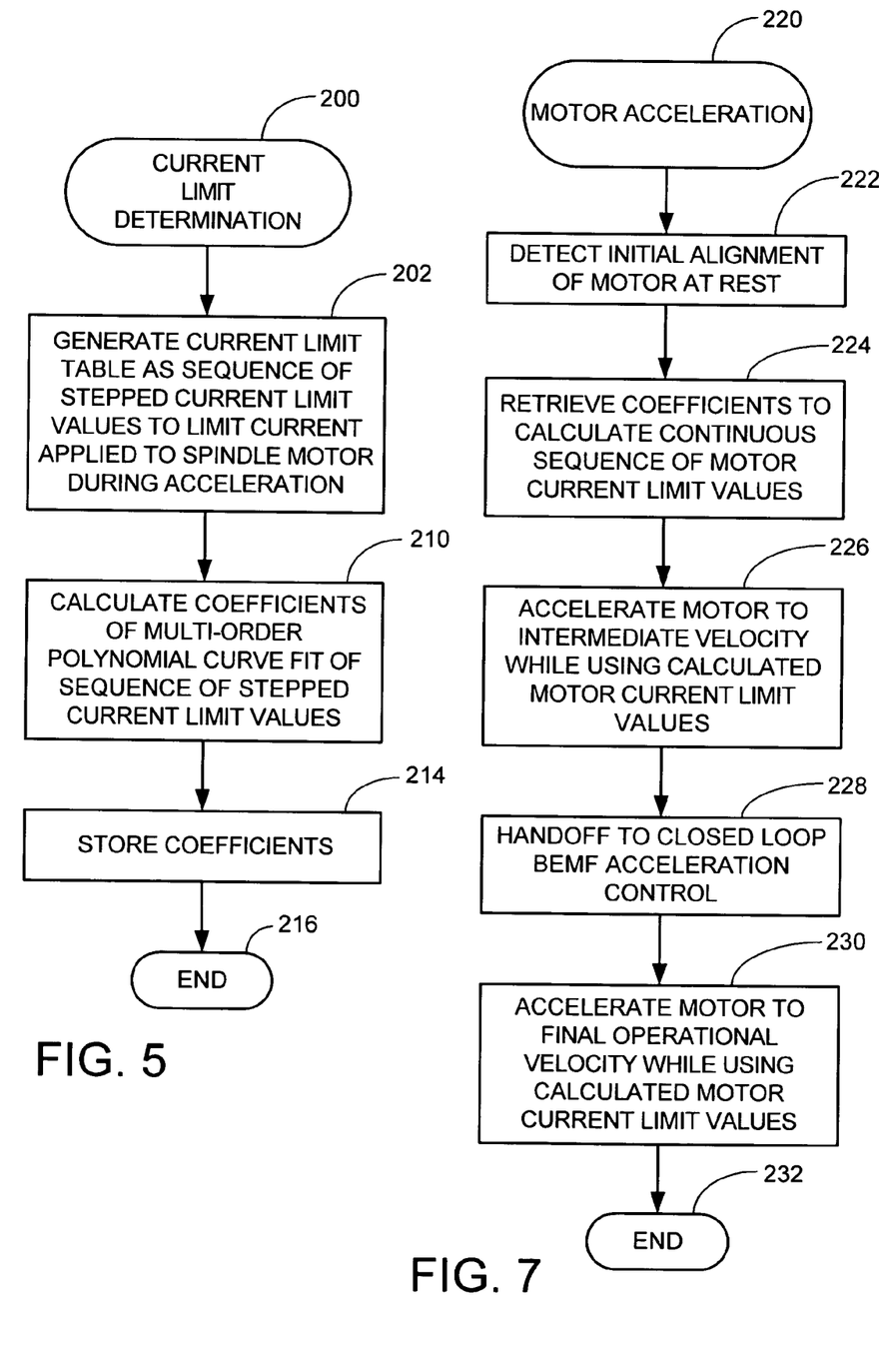
FIG. 5 is a flow chart for a CURRENT LIMIT DETERMINATION routine.
FIG. 7 is a flow chart for a MOTOR ACCELERATION routine.

Reference is now made to FIG. 5 which provides a flow chart for a CURRENT LIMIT DETERMINATION routine 200. The routine 200 generally represents steps carried out in accordance with preferred embodiments of the present invention to generate current limit values to limit current applied to the spindle motor during acceleration.

At step 202, a current limit table is obtained as a stepped sequence of current limit values. With reference back to FIG. 4, these values are converted from digital to analog form by the DAC 148 to establish the REF values supplied to the negative input of the comparator 152.

Figure 6:
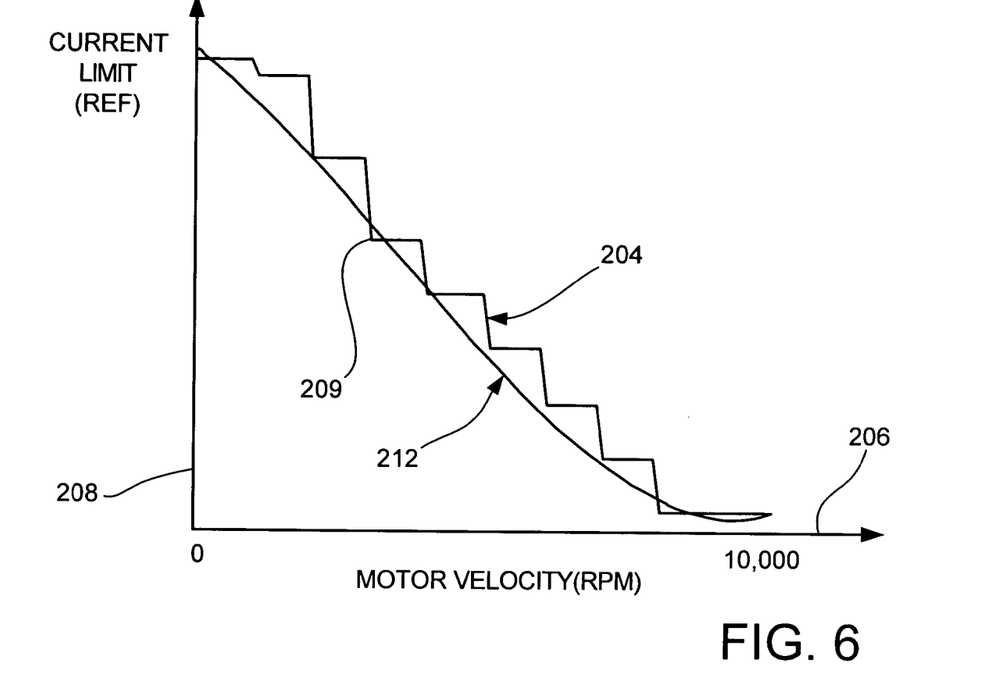
FIG. 6 provides graphical representations of a series of current limit table values and an associated multi-order current limit curve for the spindle motor.

Representative table values are graphically set forth by stepped current limit curve 204 in FIG. 6. The curve 204 is plotted against an x-axis indicative of motor velocity (e.g., rpm) and a y-axis 208 indicative of current limit magnitude. Higher current limit values are used to supply relatively greater amounts of current at low motor velocity, where greater initial motor torque is required. As the motor gains velocity, the current limit values are reduced until the final operational velocity (10,000 rpm) is reached.

As will be apparent from a review of FIG. 6, each value in curve 204 corresponds to a selected subrange of motor velocities (i.e., from rest to 1,000 rpm, from 1,000 to 2,000 rpm, etc.). The motor speed is continuously measured and the successive current limit values are used as each velocity boundary is reached. Thus, each current limit value in the stepped sequence of FIG. 6 is applied to a plurality of different measured intermediate motor velocities. It will be understood that while eleven values have been represented in FIG. 6, any number of sequentially stepped values can be utilized as desired.

The table values obtained in step 202 of FIG. 5 can be obtained in any number of ways, including empirical studies performed during drive development. Generally, a preferred approach comprises dividing the range of velocities from rest to the operational velocity into a number of adjacent contiguous subranges and selecting an appropriate current limit table value for each subrange.

During operation, the actual velocity of the motor is measured and the appropriate table value is applied in relation to the subrange in which the actual velocity falls. Thus, each one of the discrete current limit values establishes a maximum current magnitude for the motor over a plurality of intermediate velocities less than the operational velocity.

The selection process used to arrive at the table values should preferably take a number of considerations into account, including the maximum allotted current draw that can be made from the power supply used to supply the motor current, and the available time to get the spindle motor to the final operational velocity. The table values can be adapted on a per-drive basis during the manufacturing process so that an initial set of table values are loaded and then adjusted as required based on the characteristics of the individual spindle motor 106.

Once a table of current limit values is obtained, the flow of FIG. 5 continues to step 210 where coefficients are preferably determined for a multi-order polynomial curve fit of the table values. An illustrative third-order curve is shown at 212 in FIG. 6. Any suitable methodology can be used to obtain the coefficients, such as by using the Matlab® Polyfit module commercially available from The Mathworks, Inc., Natick, Mass., U.S.A. The curve 212 is preferably obtained using the lowest velocity for each table value (such as the point 209 shown in FIG. 6).

The curve 212 is generally expressed in accordance with the following third-order relationship:

$$REF = a(RPM)^3 + b(RPM)^2 + c(RPM) + d \qquad (1)$$

where REF is the resulting current value (in digital form), RPM is the measured motor velocity, and a, b, c and d are the aforementioned coefficients selected to provide the best fit to the table values. Appropriate binary arithmetic conversions are carried out as required to account for fixed point code implementations, representations of the various values in twos complement form, etc. Once obtained, these coefficients are stored at step 214 and the routine of FIG. 5 ends at step 216.

It will be readily apparent that a multi-order polynomial model is a preferred approach to deriving the continuous sequence of current limit values represented by curve 212, but such is not limiting. Rather, other methodologies for deriving the continuous sequence of current limit values from the discrete current limit values, including sine wave and other modeling, can be readily adapted depending upon the requirements of a given application.

It will be noted that unlike the discrete sequence of current limit values (e.g., curve 204), each of the current limit values in the continuous sequence of current limit values (e.g., curve 212) has a different magnitude for each different one of the plurality of intermediate velocities.

Motor acceleration is thereafter generally carried out in accordance with a MOTOR ACCELERATION routine 220 as shown in FIG. 7. The initial electrical rotational alignment of the motor 106 is determined at step 222. This is preferably carried out by applying short duration sense pulses to all six commutation states and measuring the associated rise times of the resulting voltages at the node 180. The sense pulses are of small enough amplitude and duration so as to not impart a torque to the spindle motor 106 sufficient to induce movement of the motor, but the pulses are provided with sufficient amplitude and duration to enable detection of the electrical position of the motor.

Once the initial alignment is determined, the coefficients identified by the routine of FIG. 5 are loaded in the current limit generator block 146 at step 224, and electrical commutation of the motor commences at step 226 in the sequence set forth by Table 1 starting with the commutation state detected during step 222. During step 226, short, fixed duration current pulses are successively applied by the driver circuit 142 followed by measurements of the electrical position of the rotor to detect each commutation state change.

It will be noted that, due to the continuous nature of the motor limit curve 212, a different current limit value will generally applied for each different motor velocity measurement, allowing a smoother acceleration transition.

The motor is accelerated in this manner until an intermediate velocity is reached, which is a velocity at which the motor 106 generates sufficient bemf to enable the motor control circuit 136 to achieve frequency lock on the motor. At this point the routine performs a control handoff at step 228 and the motor control circuit 136 thereafter operates in a closed-loop fashion to continue acceleration of the motor 106 to the final operational velocity (e.g., 10,000 rpm) during step 230.

The acceleration during step 230 is carried out using the bemf detection circuitry 142 and the commutation circuitry 144 and results in the application of variable duration current pulses to the spindle motor in relation to the detected bemf. The acceleration routine then ends at step 232 and the motor control circuit 136 nominally maintains the rotational velocity of the motor at the final operational velocity.

Accelerating the spindle motor 106 in accordance with the routines of FIGS. 5 and 7 provides several advantages over using a table of current limit values such as set forth by curve 204 in FIG. 6. Depending upon the configuration of the motor 106, faster and more efficient acceleration of the motor 106 can be obtained, as represented by FIG. 8.

Figure 8:
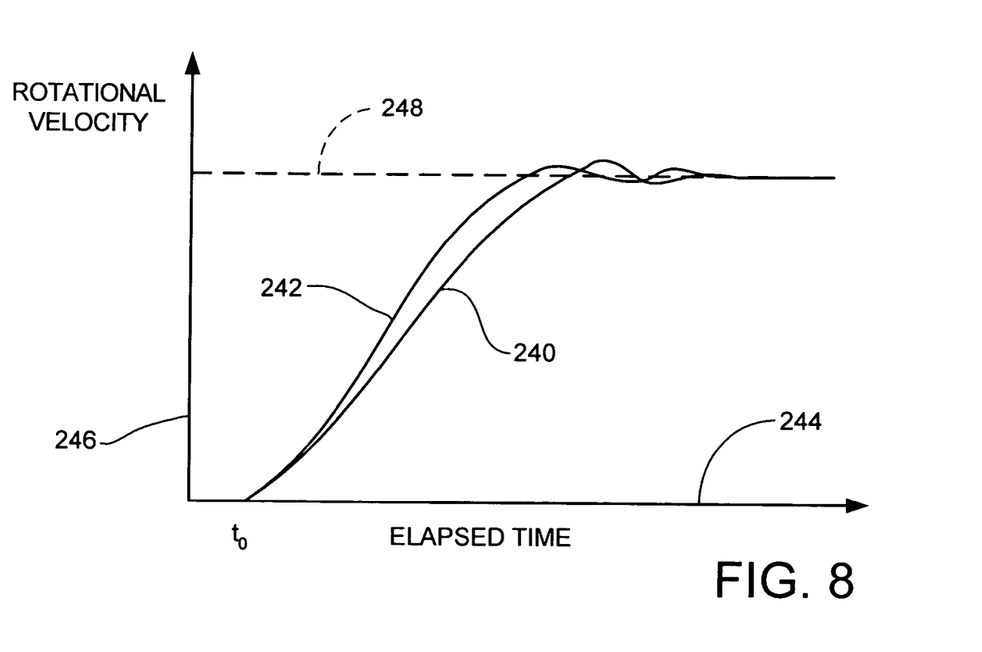
FIG. 8 provides graphical representations of respective acceleration curves for the spindle motor using the table values and limit curve of FIG. 6.

More particularly, FIG. 8 shows first and second acceleration curves 240, 242 plotted against an elapsed time x-axis 244 and a velocity y-axis 246. The first curve 240 is representative of acceleration of the motor from rest to the operational velocity (threshold line 248) using the table curve 204 (FIG. 6). The second curve 242 represents acceleration of the motor to rest to the operational velocity using the continuous sequence of current limit values (curve 212).

Figure 9:
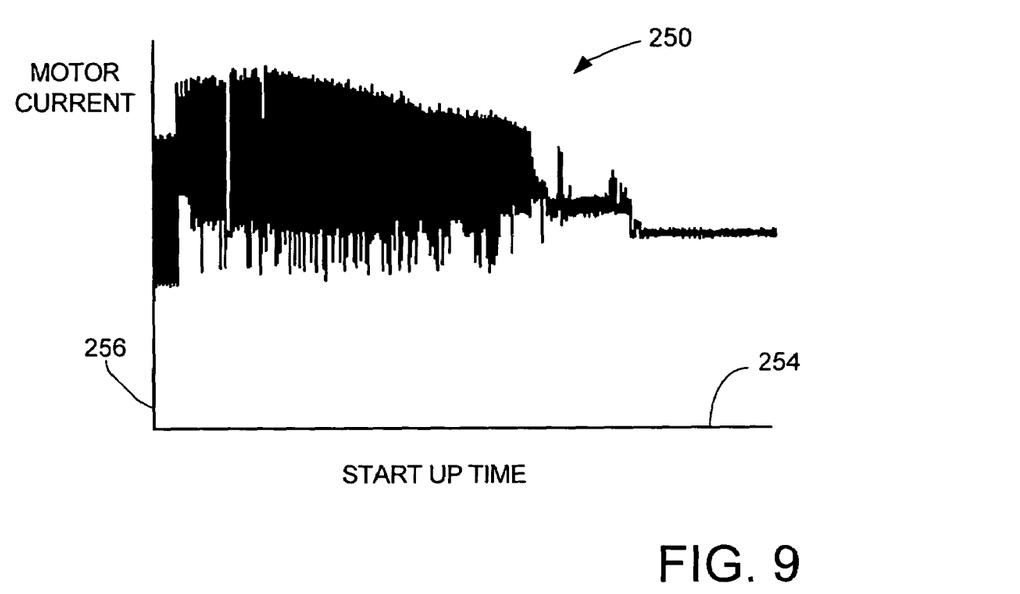
FIGS. 9 and 10 provide graphical representations of motor current utilizing the table values and limit curve, respectively, of FIG. 6.
Figure 10:
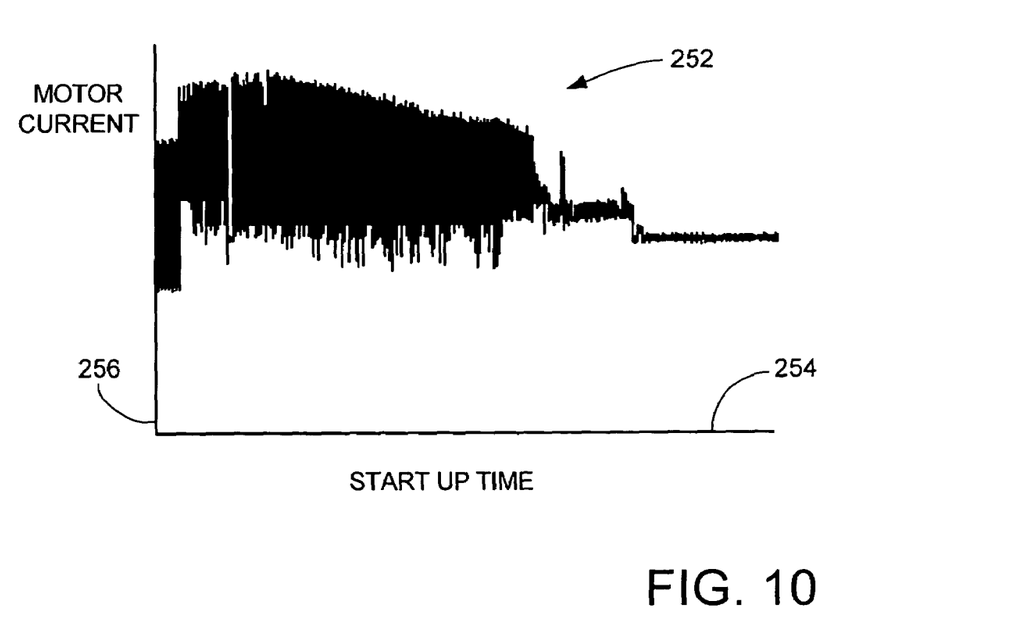

Improved current control is also provided using the current limit curve 212. FIGS. 9 and 10 show first and second current curves 250, 252 representative of first and second sets of current drive pulses supplied to the spindle motor 106 when accelerated using the table curve 204 and the limit curve 212, respectively. The curves 250, 252 are plotted against elapsed time x-axes 254 and current amplitude y-axes 256. As can be seen from FIGS. 9 and 10, the second set of current drive pulses (curve 252) exhibits better current control characteristics (including reduced spiking) as compared to the first set of current drive pulses (curve 250).

Figure 11:
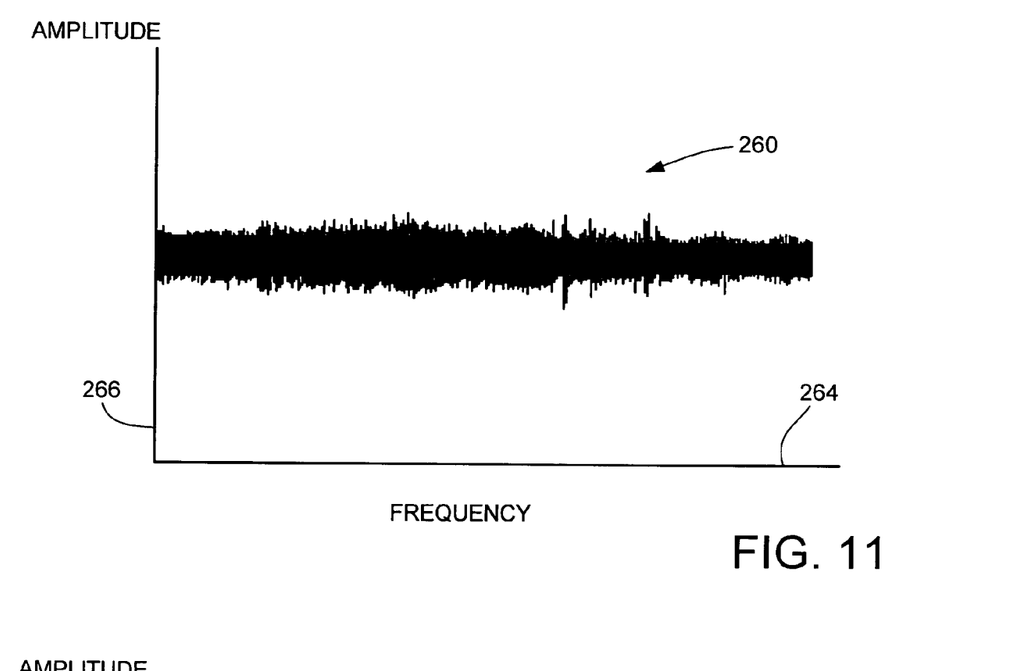
FIGS. 11 and 12 provide graphical representations of acoustic noise measurements obtained during acceleration of the spindle motor utilizing the table values and limit curve, respectively, of FIG. 6.
Figure 12:
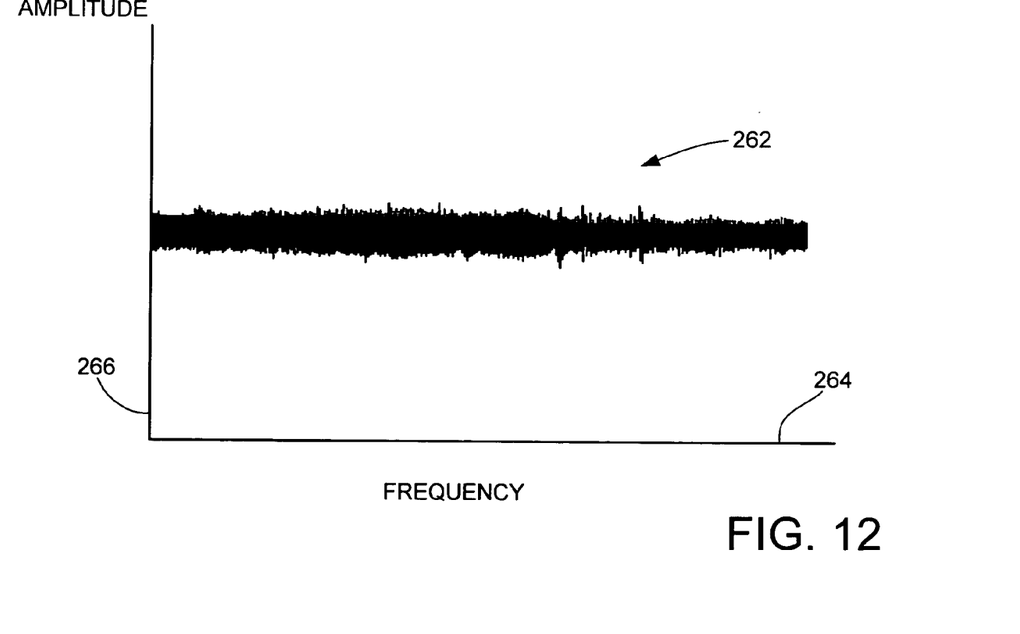

Accelerating the motor 106 using the limit curve 212 further desirably reduces the generation of acoustic noise, as exhibited by FIGS. 11 and 12. FIG. 11 provides a sound pressure curve 260 obtained using the table curve 204. FIG. 12 provides a sound pressure curve 262 obtained using the limit curve 212. Both curves are plotted against frequency x-axes 264 and amplitude y-axes 266.

As can be observed from FIGS. 11 and 12, the continuous transition in current limit reduction provided by the limit curve 212 can provide a significant reduction in the acoustic noise generated by the drive 100, due in part to the lack of step-wise transitions in the current magnitudes provided by the stepped table curve 204.

Yet another advantage to generating the current limit values in the manner described above is that a reduction in memory requirements can be achieved as compared to those required to store and utilize the discrete current limit table. This can be important in high performance applications where internal memory and other overhead control considerations are at a premium, such as in the data storage device 100.

While preferred embodiments discussed above have been generally directed to acceleration of the spindle motor 106, it will be readily apparent to those skilled in the art that the same technique can generally be applied to the VCM 116 to control acceleration of the heads during a seek operation.

It will now be appreciated that the present invention (as embodied herein and as claimed below) is generally directed to a method and an apparatus for accelerating a motor to an operational velocity.

In one aspect, the method preferably comprises a step of accelerating the motor using a continuous sequence of current limit values derived from a plurality of discrete current limit values, wherein each discrete current limit value establishes a maximum current magnitude for the motor over a plurality of intermediate velocities less than the operational velocity, and wherein each current limit value in the continuous sequence of current limit values has a different magnitude for each different one of the plurality of intermediate velocities.

The continuous sequence of current limit values is preferably derived by generating coefficients of a multi-order polynomial curve in relation to the discrete current limit values, and obtaining the continuous sequence of current limit values in relation to said coefficients.

In another aspect, the apparatus preferably comprises a current limit generator block which outputs a continuous sequence of current limit values to limit magnitudes of current applied to the motor during said acceleration, wherein the continuous sequence of current limit values are derived from a plurality of discrete current limit values, wherein each discrete current limit value establishes a maximum current magnitude for the motor over a plurality of intermediate velocities less than the operational velocity, and wherein each current limit value in the continuous sequence of current limit values has a different magnitude for each different one of the plurality of intermediate velocities.

The current limit generator block preferably uses coefficients of a multi-order polynomial curve to output the continuous sequence of current limit values, wherein the coefficients of the multi-order polynomial curve are determined by providing an initial current limit table comprising a stepped sequence of discrete current limit values each applied while the motor is operated at a plurality of intermediate rotational velocities less than the operational velocity, and performing a multi-order polynomial curve fit of the stepped sequence of discrete current limit values.

The apparatus further preferably comprises a switching circuit which selectively applies current pulses to the motor to accelerate the motor in relation to the application of commutation drive signals, and a control block which applies the commutation drive signals to the switching circuit in relation to the continuous sequence of current limit values.

The apparatus further preferably comprises back electromotive force (bemf) detection circuitry which detects bemf from rotation of the motor, and wherein the control block further applies the commutation drive signals to the switching circuit in relation to the bemf detected by the bemf detection circuitry.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

In addition, although the embodiments described herein are directed to the acceleration of a spindle motor in a data storage device, it will be appreciated by those skilled in the art that such embodiments are for purposes of illustration and are not limiting, as other types of applications can readily be used without departing from the scope of the claimed invention.

What is claimed is:

1. A method comprising a step of accelerating a motor to an operational velocity using a continuous sequence of current limit values derived from a plurality of discrete current limit values, wherein each discrete current limit value establishes a maximum current magnitude for each of a plurality of intermediate velocities less than the operational velocity, and wherein each current limit value in the continuous sequence of current limit values has a different magnitude for each of the plurality of intermediate velocities.

2. The method of claim 1, wherein the continuous sequence of current limit values is derived by generating coefficients of a multi-order polynomial curve in relation to the discrete current limit values, and obtaining the continuous sequence of current limit values in relation to said coefficients.

3. The method of claim 2, wherein the continuous sequence of current limit values are used to limit magnitudes of a set of current pulses applied to accelerate the motor from rest to the operational velocity.

4. The method of claim 3, wherein the accelerating step comprises establishing reference voltages in relation to the continuous sequence of current limit values and controlling the magnitudes of the current pulses in relation to the reference voltages.

5. The method of claim 1, further comprising providing back electromotive force (bemf) detection circuitry which detects a bemf from rotation of the motor and commutation circuitry which electrically commutates the motor in relation to the detected bemf over a range of commutation states, and wherein the accelerating step further comprises using the bemf detection circuitry and the commutation circuitry to accelerate the motor to the operational velocity in relation to the bemf detected from the motor.

6. The method of claim 1, wherein the plurality of discrete current limit values of the accelerating step comprises a stepped sequence of successively decreasing current limit values.

7. The method of claim 6, wherein the accelerating step further comprises performing a curve fit operation to determine the coefficients of a third-order polynomial representation of said stepped sequence.

8. A method for accelerating a motor, comprising:
providing a current limit table comprising a stepped sequence of discrete current limit values, wherein each discrete current limit value establishes a maximum current magnitude for each of a plurality of intermediate velocities less than an operational velocity;
deriving a continuous sequence of current limit values in relation to said discrete current limit values, each current limit value in the continuous sequence of current limit values having a different magnitude for each of the plurality of intermediate velocities; and
using the continuous sequence of current limit values to accelerate the motor to an operational velocity.

9. The method of claim 8, wherein the deriving step comprises generating coefficients of a multi-order polynomial curve in relation to the discrete current limit values, and obtaining the continuous sequence of current limit values in relation to said coefficients.

10. The method of claim 8, wherein the using step comprises establishing reference voltages in relation to the continuous sequence of current limit values and controlling the magnitudes of the current pulses in relation to the reference voltages.

11. The method of claim 8, further comprising providing back electromotive force (bemf) detection circuitry which detects a bemf from rotation of the motor and commutation circuitry which electrically commutates the motor in relation to the detected bemf over a range of commutation states, and wherein the using step further comprises using the bemf detection circuitry and the commutation circuitry to accelerate the motor to the operational velocity in relation to the bemf detected from the motor.

12. The method of claim 8, wherein the deriving step comprises performing a curve fit operation to determine the coefficients of a third-order polynomial representation of the stepped sequence of discrete current limit values.

13. The method of claim 8, wherein each current limit value in the continuous sequence of current limit values has a different magnitude for each different one of the plurality of intermediate velocities.

14. The method of claim 8, further comprising providing a generator block which is adapted to carry out the deriving and using steps.

15. An apparatus for accelerating a motor to an operational velocity comprising a current limit generator block which outputs a continuous sequence of current limit values to limit magnitudes of current applied to the motor during said acceleration, wherein the continuous sequence of current limit values are derived from a plurality of discrete current limit values, wherein each discrete current limit value establishes a maximum current magnitude for each of a plurality of intermediate velocities less than the operational velocity, and wherein each current limit value in the continuous sequence of current limit values has a different magnitude for each different one of the plurality of intermediate velocities.

16. The apparatus of claim 15, wherein the current limit generator block uses coefficients of a multi-order polynomial curve to output the continuous sequence of current limit values, wherein the coefficients of the multi-order polynomial curve are determined by providing an initial current limit table comprising a stepped sequence of discrete current limit values each applied while the motor is operated at a plurality of intermediate rotational velocities less than the operational velocity, and performing a multi-order polynomial curve fit of the stepped sequence of discrete current limit values.

17. The apparatus of claim 16, further comprising:
   a switching circuit which selectively applies current pulses to the motor to accelerate the motor in relation to the application of commutation drive signals; and
   a control block which applies the commutation drive signals to the switching circuit in relation to the continuous sequence of current limit values.

18. The apparatus of claim 17, further comprising back electromotive force (bemf) detection circuitry which detects a hermit from rotation of the motor and wherein the control block further applies the commutation drive signals to the switching circuit in relation to the bemf detected by the bemf detection circuitry.

* * * * *